(12) United States Patent
Chapman et al.

(10) Patent No.: US 6,216,228 B1
(45) Date of Patent: Apr. 10, 2001

(54) CONTROLLING VIDEO OR IMAGE PRESENTATION ACCORDING TO ENCODED CONTENT CLASSIFICATION INFORMATION WITHIN THE VIDEO OR IMAGE DATA

(75) Inventors: Sydney George Chapman, Winchester; Julian Hamilton Jones, Romsey, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/950,006

(22) Filed: Oct. 14, 1997

(30) Foreign Application Priority Data

Apr. 23, 1997 (GB) .................................................. 9708192

(51) Int. Cl.[7] ...................................................... G09C 5/00
(52) U.S. Cl. ........................... 713/176; 380/239; 380/206; 713/176; 713/179
(58) Field of Search ................................ 380/10, 4, 3, 9, 380/22, 20, 5, 239, 206; 360/60; 386/1; 713/179, 176

(56) References Cited

U.S. PATENT DOCUMENTS

| 5,265,082 | * | 11/1993 | Gniewek et al. | 369/53 |
|---|---|---|---|---|
| 5,321,750 | * | 6/1994 | Nadan | 380/20 |
| 5,664,018 | * | 9/1997 | Leighton | 380/54 |
| 5,745,569 | * | 4/1998 | Moskowitz et al. | 380/4 |
| 5,748,763 | * | 5/1998 | Rhoads | 382/115 |
| 5,889,868 | * | 3/1999 | Moskowitz et al. | 380/21 |
| 5,905,800 | * | 5/1999 | Moskowitz et al. | 380/28 |
| 5,930,369 | * | 7/1999 | Cox et al. | 380/54 |

* cited by examiner

Primary Examiner—Tod Swann
Assistant Examiner—Todd Jack
(74) Attorney, Agent, or Firm—Scully, Scott, Murphy & Presser; Marian Underweiser, Esq.

(57) ABSTRACT

Provided is a method and a system for automatically controlling display of video or image data in dependence on content classification information which is integrated within the data by means of invisible digital watermarking techniques. A controller decodes the watermarked content codes and then prevents displaying of certain material, by overlaying the display with blanking data, if the codes match certain stored codes which the controller has been set to respond to.

The use of invisible digital watermark codes by a controller which operates in response to the watermark codes provides reliable control since the codes are more difficult for unauthorized persons to detect and remove than other embedded codes would be.

11 Claims, 5 Drawing Sheets

CONTROLLING VIDEO OR IMAGE PRESENTATION ACCORDING TO ENCODED CONTENT CLASSIFICATION INFORMATION WITHIN THE VIDEO OR IMAGE DATA

FIELD OF INVENTION

The present invention relates to controlling the presentation of video or image material in accordance with video or image data content classification information integrated with the video or image data.

BACKGROUND

In recent years there has been increasing concern in many countries about the ease of access to pornographic or violent material, and in particular the effects it may have on young people. Parents and many governments have thus identified a need to enable control of access of certain groups of people to certain types of material. In the past, controls imposed to achieve this aim involved physically preventing unauthorised people accessing restricted recordings: for example, classifying movies according to a minimum age for which they are suitable and then restricting entry to cinemas, and legislating on the minimum age of person to which pornographic magazines may be sold.

As the availability of video material has increased with the ready availability of video tape recordings and domestic equipment on which they can be played, and with the enormous increase of material (including image and video collections) which is available from Internet-connected server computers and the development of video-on-demand services providing remote computer access to video recordings via server computers, the importance of protection and control has increased and the effectiveness of the existing controls has reduced. There is a requirement for controls whereby certain classifications of video and image material cannot be viewed by unauthorised people—such as by enabling parents to control whether a given class of video material will be viewable by their children or not.

A number of solutions to this problem have been suggested which involve transmitting or recording a classification code together with program material for use in automatic censorship or control.

For example, U.S. Pat. No. 4,930,158 discloses recording a program classification code as a digital word located on a specific line of the video signal. This code is recovered when the video recording is played and is used to inhibit replay if the code matches any of a set of user-specified codes. Parents can set the codes when recording a program to prevent children viewing that program.

U.S. Pat. No. 4,930,160 discloses automatic censoring of video programs by receiving a program and a classification code indicative of program content and, for certain prescribed classification codes, switching display to an alternative source so that alternative program material is displayed. The classification code may be encoded into a broadcast or separate from it. A 'set classification' routine is used for entering the classifications to be censored as an 8 bit word.

U.S. Pat. No. 5,253,066 discloses use of a signal indicating a class of program being viewed or recorded which signal is additional to a program signal. A viewer selects a set of classifications to be permitted. While a received program indicating signal indicates that the current program is of a permitted classification, recording or viewing of a program is enabled.

U.S. Pat. No. 5,387,942 discloses use of a portion of the blanking interval of a video signal for inserting a digital program code indicating program content. This code is then transmitted along with the audio and video information and is subsequently extracted for use in blocking the display of certain signals if the code matches any of a set of stored codes.

U.S. Pat. No. 5,195,135 discloses frame-by-frame intra-program censorship, using classification data encoded in an audio-video signal. The classification codes classify program material for several different censorship levels. Censorship is then achieved by automatically obscuring the audio and/or video signal in a manner which blurs the image rather than blanking or substituting the image.

EP-A-0549169 discloses a video encoder inserting identification information in the active image portion of a video signal. Tagging data comprising a series of signal pulses causing the video waveform to cross a predetermined threshold is inserted in the active portions of fields at pseudo-random locations, the positions of the pulse marks pseudo-randomly changing position with sequential fields. Such tagging data is somewhat more difficult to detect and remove than identification information which is embedded in a non-displayed portion of the signal (such as in the vertical blanking interval or the synchronisation portion). However, the tagging of EP-A-0549169 relies on the persistence of human vision and the ever-changing position of the inserted marks between each frame for those marks to not be perceptible to the human eye when displayed normally. Nevertheless, the tagging data according to EP-A-0549169 comprises distinct transitions in the video signal which are relatively easy to detect within a given image frame and to remove electronically.

Each of the above prior art disclosures identifies a solution for video program censoring which involves the addition of classification information as a distinct and easily identifiable addition to the image data. Since such classification information would be relatively easy to detect, it would also be relatively easy to remove and a video presentation control system which is dependent on such codes could be by-passed using relatively simple electronics. If censorship controls are to be effective, the classification codes and controls which use those codes must be difficult to tamper with and this remains a problem which has not been adequately solved by the existing solutions.

The US Telecommunications Act of 1996 included initiatives for enabling parental control over what is presented via television screens—effectively requiring inclusion of a viewing controller computer chip or "V-chip" within new television sets. The V-chip has been proposed as a means to enable automatic blocking of presentation of certain television programs on the basis of a content rating system. Broadcasters and other providers of video programming in the US have been encouraged to transmit or record program content information for detection by the V-chip, and television manufacturers will be required to implement the necessary electronics to respond to this information. When installed on a television or a set-top device such as a cable television signal receiver unit, or a satellite communication receiver unit, the V-chip is intended to allow the viewer to customize their family's program reception to prevent display of certain types of program. While the recent legislation has increased the attention given to censorship and television viewing controls, it has not resulted in any significant technical advances in blocking technology. To date, V-chip proposals have involved the use of unallocated bandwidth in the vertical blanking interval of a video signal for the purpose of transmitting program content information.

It has been recognised that similar technology can be implemented within computers for controlling material accessed via the internet. For internet-specific on-line content control, a common protocol for ratings labels known as the Platform for Internet Content Selection (PICS) has been developed. PICS allows attachment of universally recognisable electronic labels to the text or image in documents to alert parents about the nature of their content before the computer displays them or passes them on to another computer. Ratings may be embedded by the publisher of the material, a company providing internet access, or others. To date, the ratings labels used in this area have been 'visible' (i.e. easily detectable) labels.

There remains a need for an improved system and method for content-based control of the presentation of video material.

SUMMARY OF INVENTION

In a first aspect, the present invention provides a controller for controlling displaying on a display means of received video or image data which has been encoded with invisible digital watermarks representing a content classification for the video or image data, the controller comprising:

means for detecting digital watermarks within the received video or image data;

means for decoding the watermarks to obtain the content classification information; and means for controlling the displaying of said video or image data in response to the content classification information obtained from the watermarks.

Controllers according to preferred embodiments of the invention are implementable within or in connection with television sets or personal computers for controlling the display of video and images on the television or computer display screen, and are adapted to receive video or image data signals from a receiver of transmitted digitised video or image data and/or from a player which plays back recorded video or image data from a recording medium.

A digital watermark in this context is information integrated within the data content of an image by embedding it within the pixel values of the image as modifications of the original image pixel values. An 'invisible' digital watermark is one in which the information has been distributed invisibly such that the process of embedding the watermark does not produce visible changes to the image. The term 'invisible' is used in the art in relation to digital watermarking techniques which are designed to produce minimally perceptible watermarks—those which are in practice imperceptible to a human viewer without an appropriate decoder key. Such distributed embedded watermarks are algorithmically recoverable from all or part of the original image or from reproductions thereof with the correct decoder key, but are very difficult to detect or to remove from the image without the correct decoder key.

Since the watermark is an integral part of the data, the use of watermarks for embedding content classification information within video and images does not require separate data bits to be added to the image or video data stream. Separate tagging fields or other additional data bits can be detected and removed or tampered with more easily than invisible digital watermarks, and so encoding of invisible digital watermarks for content classification enables more reliable and secure control of video or image viewing than is possible with systems which add separate data bits.

Although techniques for digital watermarking of images are known, watermarking has conventionally only been used for inserting information within an image to enable subsequent identification and verification (such as to enable demonstration of unauthorised copying or alteration). For example, the owner of photographic images may be prepared to make the images available for public view but only if any misappropriation or alteration of the image can be demonstrated. Thus, digital watermarking of images has been used in the past to enable subsequent identification to confirm ownership, thereby to act as a deterrent against unauthorised copying and to provide evidence for action against copyright infringers. Digital watermarks within images may include an identification of the copyright owner.

The present invention is clearly distinguished from such known uses of digital watermarks in images since, according to the present invention, the presentation of image or video data is controlled in dependence on watermarked content classification codes. Previous uses of watermarks within images have not involved control of operations in dependence on or in response to the watermarked information, except for operations which are part of an image verification process. While it is known to hide information as an integral part of an image using watermarks and it is known that this is a secure method of embedding information which is not to be removed, "invisible" watermarks have not in the past been considered for use in automatic control of the displaying of the images, or any other dynamic operation control. One reason why this use of watermarks for dynamic operation control has not been suggested previously is that it seems counter-intuitive to the fundamental requirement of "invisible" watermarks to be difficult to detect within the scope of normal signal processing.

According to a preferred embodiment of the invention, the means for decoding includes means for identifying watermark codes within the video data and extracting the identified codes and means for comparing them with stored codes defining classes of image or video material for which viewing is either permitted or not permitted. The identification and extraction of watermarks is enabled by a decoder key which is preferably provided by the video or image data provider.

The controller automatically prevents display of any video or image data having content classifications defined as prohibited. The decoder can thus prevent display of entire programs having a content which is considered unsuitable for viewing. For example, parents can set the decoder to prevent display via their television set of programs having a sexual or violent content so as to censor their children's viewing. Alternatively, the watermark codes can be encoded separately for different portions of a program such that the different content of the different program portions can be taken account of. The controller may prevent display of certain portions, either by overlaying the video or image data with blanking data, by preventing transfer of the video or image data to the video display, or by scrambling the data which is sent so as to display an unintelligible picture for the portions deemed unsuitable for display.

The encoding of invisible digital watermarks for use by a controller according to the invention preferably comprises generating within a digital image comprising an array of picture elements a digital watermark comprising modifications to pixel intensity values within randomly selected pairs of pixel clusters of the image. The intensity values in one cluster of the pair are increased and the intensity values in the other cluster are decreased by a corresponding amount. An alternative embodiment uses similarly inter-dependent modifications to pairs of pixels within a single cluster of pixels which leaves the overall brightness of the cluster unchanged.

In an alternative embodiment, the watermark comprises perturbations of colour values or pixels within selected pixel clusters of the image. The colour values of individual pixels within a cluster are adjusted in a co-dependent manner such that colour values for each cluster as a whole are unchanged. This makes the adjustments imperceptible to the human eye. The arrangement of perturbed clusters is algorithmically determined to produce the required watermark representing particular information.

One of the advantages of the present invention is that it is largely able to utilise existing commercially available equipment, and so wide-scale implementation of the invention would not involve great expense in the replacement of existing equipment. No changes are required, for example, to existing television program broadcasting or signal reception equipment and the encoding of invisible digital watermarks can use known techniques.

In second and third aspects of the invention, there is provided a computer system and a television set, respectively, each having integrated therein a controller for controlling displaying of received video data which has been encoded with invisible digital watermarks representing a content classification for the video data, the controller comprising:

means for detecting digital watermarks within the received video data;

means for decoding the watermarks to obtain the content classification information; and means for controlling the displaying of said video data on the television or compute screen in response to the content classification information obtained from the watermarks.

In a further aspect of the invention, there is provided a video or image data communication and display system comprising:

an encoder for encoding an invisible digital watermark within the video or image data prior to transmission, said watermark including data representing content classification information for said video or image data;

a transmitter;

a receiver;

a display means for displaying the video or image data; and a controller including means for detecting digital watermarks within received video or image data, means for decoding the content classification information watermarks, and means for controlling displaying of the video or image data in dependence on the watermarked content classification data.

The invention thus provides a controller which is responsive to digital watermark codes integrated invisibly within video or image data, such that content classification information can be included within the video or image data in a manner which is very difficult to remove or tamper with. This enables reliable content-dependent control of the presentation of video and image data. Prior art use of watermarks within images has not included dynamic control of video or image display in dependence on watermark codes.

BRIEF DESCRIPTION OF DRAWINGS

Preferred embodiments of the invention will now be described in more detail, by way of example, with reference to the accompanying drawings in which.

DESCRIPTION OF PREFERRED EMBODIMENTS

Figure 1:
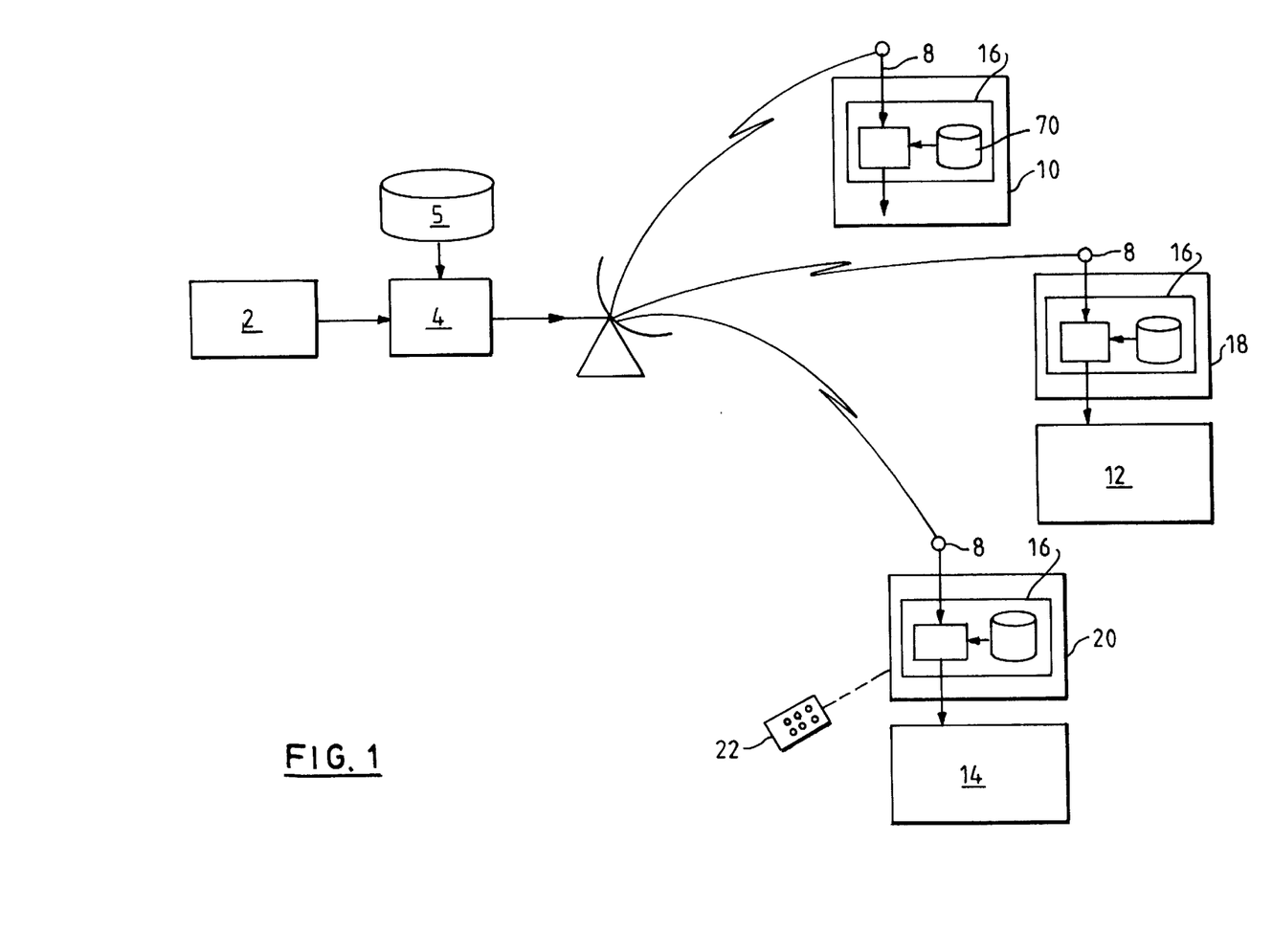
FIG. 1 is a schematic representation of a video transmission and display system including apparatus for controlling presentation of video material according to an embodiment of the invention.

A video transmission and display system in which the present invention is implemented will now be described with reference to FIG. 1, which is a block diagram showing the major system components. A video signal is provided by a program signal source 2 which, in the present example embodiment, is the signal generation equipment of a television station. In alternative embodiments the signal source may be a video camera or any video or image recording device. The video signal is processed at an encoder 4 which embeds invisibly within images of the video signal a digital watermark using an encoder algorithm retrieved from the encoder's non-volatile memory 5, the watermark representing a classification of the video content. This encoding is advantageously performed by a video program provider prior to transmission or other distribution of their video material.

Each still image of which the video program is comprised has the watermark embedded within it. In the preferred embodiment of the invention, a decoder key 38 is generated directly from the encoding algorithm when the encoding algorithm is first installed at the encoder. The video program provider uses the encoding algorithm repeatedly (for example, for all program transmissions for a one month period) and provides the decoder key (or keys) to registered end users on request to enable decoding. The encoding algorithm and the associated decoder keys are varied periodically to maintain security. A specific process of encoding which is utilised in the preferred embodiment will be identified below, but the invention could employ any known techniques for encoding invisible digital watermarks within the images. Suitable invisible digital watermark encoding techniques are discussed by Yeung, Yeo, Craver and Memon in "Resolving Rightful Ownerships With Invisible Watermarking Techniques: Limitations, Attacks, and Implications", IBM Research Report RC20755, March 1997.

Following encoding, the encoded signal is passed to a television broadcast network 6 for transmission to the public. The transmission apparatus used in the preferred embodiment is entirely conventional and so will not be described in detail herein. Conventional television signal reception apparatus 8 may also be employed for receiving the transmitted signal which is then communicated to respective ones of a plurality of connected television sets 10,12,14. These television sets include both a first plurality of sets 10 having a video display controller 16 incorporated within the set and a second plurality of sets 12,14 having a video display controller incorporated within a set top box 20 which is adapted to interoperate with the television set. Where the display controller is implemented within a set top box 18 connected between the television signal receiver apparatus 8 and the television set 12, the television set may comprise a standard set such as is commercially available today since the invention requires no changes to the television set's input connections.

Figure 2:
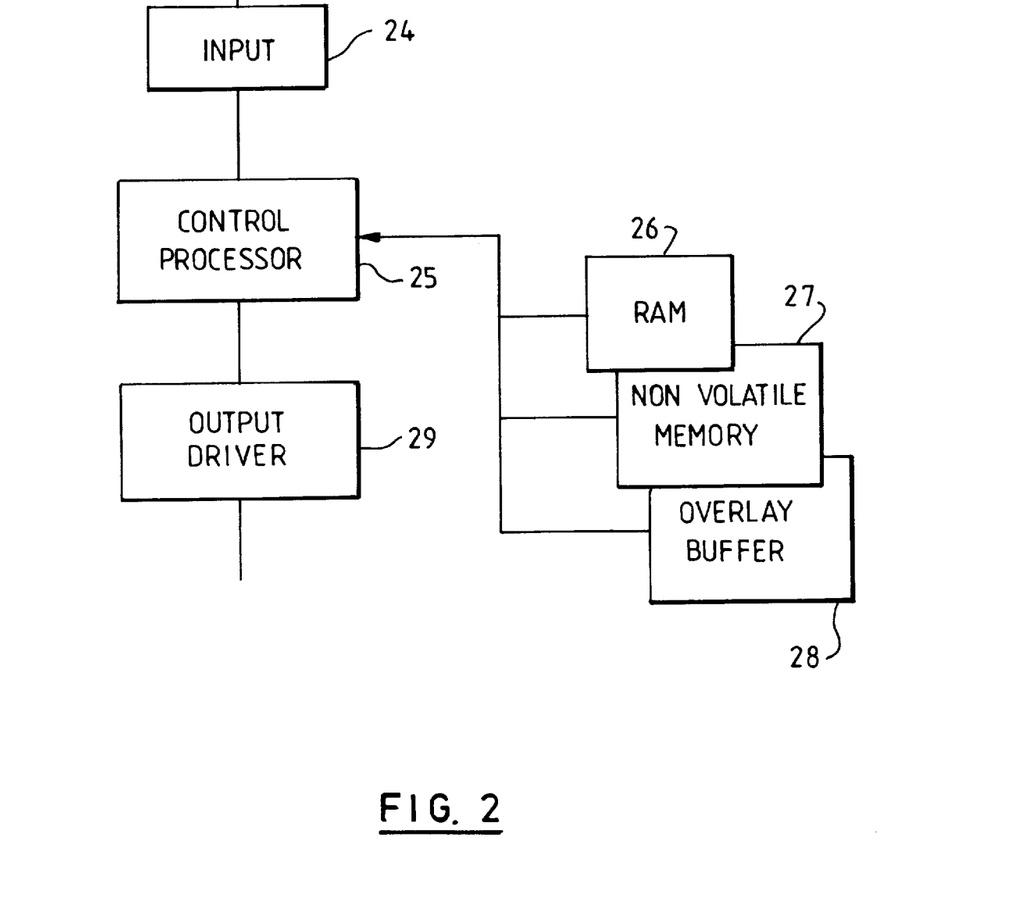
FIG. 2 is a schematic representation of the major components of a controller according to the invention.

The major components of a controller 16 according to the invention are shown in FIG. 2. A data signal received at an input 24 is passed to a control processor 25. The control processor is connected to random access volatile memory (RAM) 26, non-volatile memory 27 and to an overlay buffer 28. The control processor is connected for passing a processed signal to an output driver 29 which provides an output signal to a video display.

In the preferred embodiment, a decoder key 38 generated for extracting watermarks from watermarked images is made available by the program provider for communication to end users. To prevent the decoder keys being obtained by the very people intended to be shielded from unsuitable program material, a registration scheme is advantageously implemented by the program provider or program distributor and the decoder keys are only provided to persons meeting the registration criteria. For improved security, the encoding algorithm (and hence the required decoder key) is varied periodically. This is implemented by requiring registered users to request each new decoder key when it is required.

The video display controller 16 is adapted to detect and extract digital watermarks from the television signal and to decode the extracted watermarks to obtain the content classification codes relevant to the television program content. The controller 16 then compares these codes with a look-up table of classification codes stored in memory in the controller. The television owner or other person responsible for determining what classes of program content are to be displayable (hereafter referred to as the 'end user') is provided with a remote control device 22 which enables selection of particular classifications of program which are not to be displayed on the television screen. The end user can thus determine the particular desired response for each class of encoded program material by a sequence of key selections including transmitting the selection to the television set or set top box housing the controller. The remote control device according to the preferred embodiment utilises existing technology which has been widely implemented in remote controls for television sets or video recorders (for example, using controls such as those implemented for Teletext page selection or 'VideoPlus' program selection), simply adding functions for content classification selection and password controls to prevent unauthorised use, and so need not be described in more detail herein.

If the controller identifies a match between the content classification codes of the received video data and stored codes which the end user has specified as not to be displayed, then the controller automatically prevents displaying of all video material which includes the particular watermarked classification code. The controller thus has a first part for detecting and decoding watermarks and a second part connected to a display for controlling the displaying of the image or video material. The decoding and prevention of display according to the preferred embodiment of the invention will be described in more detail below.

It is desirable for the classification codes which are represented by the watermarks encoded by broadcasters to be standardised (preferably for all television broadcasters) to enable the public to develop a clear understanding of what each code represents and so to enable effective customisation by members of the public of their own viewing requirements and control over what material is displayed to their dependents. However, the table look-up process implemented within the controller could, if necessary, associate user-input selections with a variety of different broadcasters, classification codes as well as decoding different broadcasters watermarks.

Other than in its use of invisible digital watermarks and the components and operational steps required for decoding such watermarks to obtain the encoded content classification information, a controller according to the present invention may be implemented using components which are already known in the art and in particular which have already been described in relation to proposed implementations of the V-chip. As shown in FIG. 2, the controller according to the preferred embodiment has non-volatile memory for storing codes associated with particular content classifications and for storing user-entered indicators regarding whether particular classes of material should be displayed or not, and a software implemented look-up process for accessing the data stored in this memory. The controller also includes an overlay buffer in which is stored data for blanking the display screen.

The method of encoding of digital watermarks which is implemented in the preferred embodiment of the present invention is the spatial domain technique described by Bender et al between pages 315 and 320 of the article "Techniques for data hiding", IBM Systems Journal, Vol. 35, Nos. 3&4, 1996, pages 313–336 (incorporated herein by reference). Multiple pseudo-random patterns are used, as described by Bender et al in the right hand column of page 320. The embedded information used to represent a data content classification for the particular image or video data is a specific statistic.

Figure 3:
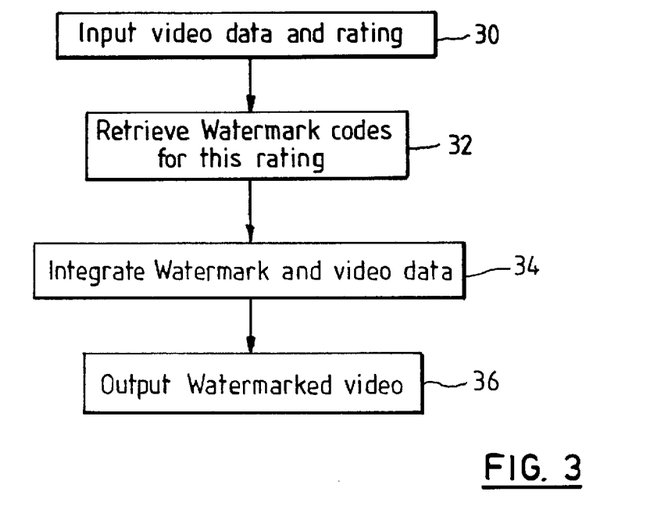
FIG. 3 is a flow diagram representing the steps of encoding of a digital watermark according to an embodiment of the present invention.
Figure 4:
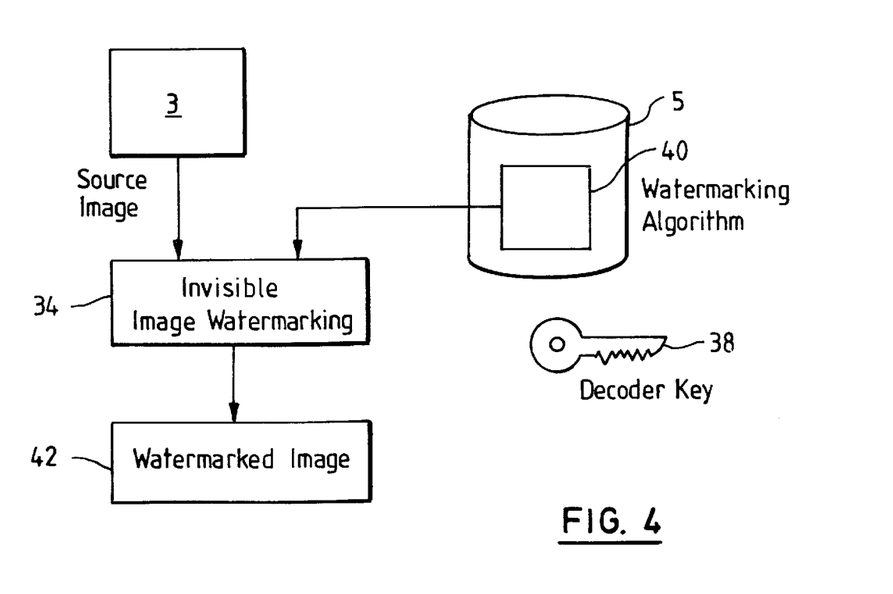
FIG. 4 is a schematic representation of the integration of a watermark and image data of FIG. 3.

The encoding of the watermarks is represented at a high level by FIGS. 3 and 4. Video program material is classified or 'rated' by a person or group of people having this responsibility on behalf of either the program creator or the program distributor. That is, in the present embodiment the initial content classification is performed by a human viewer. In alternative embodiments the content classification may be automated, making use of computer controlled image analysis techniques. The rating system may be based on the existing material content ratings for movies (PG/13, X/18, etc). The encoder 4 includes non-volatile memory 5 storing a plurality of versions or variations of a watermarking algorithm for generating a plurality of different distribution patterns of a watermark for each of a plurality of particular classifications of video material. Video is input 30 to the encoder 4 from the video source 2 together with a classification rating and the encoder retrieves 32 the appropriate version of a digital watermarking algorithm 40 for this classification from its non-volatile memory 5. Watermarks are then integrated 34 with the video data on an image-by-image (frame-by-frame) basis. A decoder key 38 relevant to the particular watermark encoding was generated from the encoding algorithm when the watermark encoding program was installed, for decoding the encoded watermark.

The output of the watermark encoding process is a sequence of watermarked images 42 which can then be sequentially transmitted as a video data stream (or alternatively placed into storage for subsequent retrieval and transmission).

Figure 5:
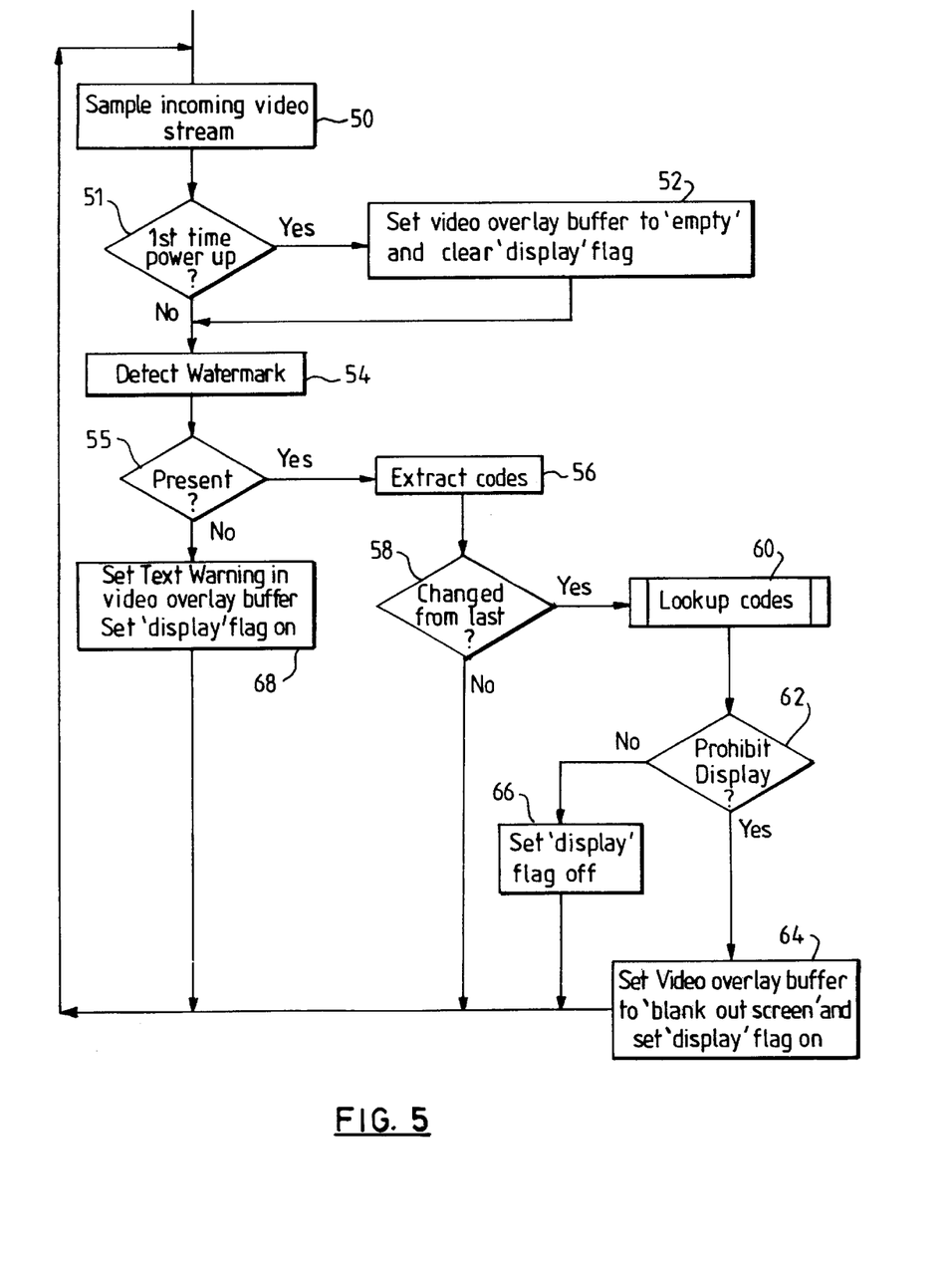
FIG. 5 is a flow diagram representing the steps of decoding a digital watermark and controlling presentation of video data in dependence on the watermark.

The decoding of watermarked images by the controller 16 will now be described in more detail with reference to FIG.

5. Received images of the transmitted data stream are inputs to the controller 16. When the controller is first powered up, its video overlay buffer is set to 'empty' and the 'display' flag is cleared 52. Using the decoder key 38 which is representative of the watermark encoding scheme, which watermark decoder is held in memory within the controller, a watermark detection step 54 is performed. If detected, the watermarked codes are extracted 56 from the received image. A determination is then made 58 by a first comparator of whether the extracted code has changed since the last extracted code. If it has changed, then non-volatile storage in the display unit is accessed 60 to obtain stored codes representing the classes of material which are to be displayed or not to be displayed. The extracted codes representing content classification are input to a second comparator which compares them 62 with codes held in non-volatile storage within the controller and identifies any match between the codes.

If there is a match between the code of the received image and a code selected by the end user as a class of material not to be displayed (determined at step 62 in FIG. 5), then a signal flag is set 64 to initiate display of the contents of the controllers overlay buffer (video overlay buffer display flag set to 'on') and the contents of the overlay buffer is set to blank out the screen (i.e. to display a black screen). The contents of the overlay buffer will then be placed into the display buffer of the display apparatus and superimposed on the video data stream such that the video data itself is not visible. If there is no match between prohibited codes and detected codes then the overlay buffer display flag is set to 'off' and the video material will be displayed normally.

In the preferred embodiment of the invention, if no watermark is detected then the video overlay buffer display flag is again set to 'on' and a text warning is set in the overlay buffer such that the text warning of the lack of a content classification watermark will be displayed together with the video data.

Figure 6:
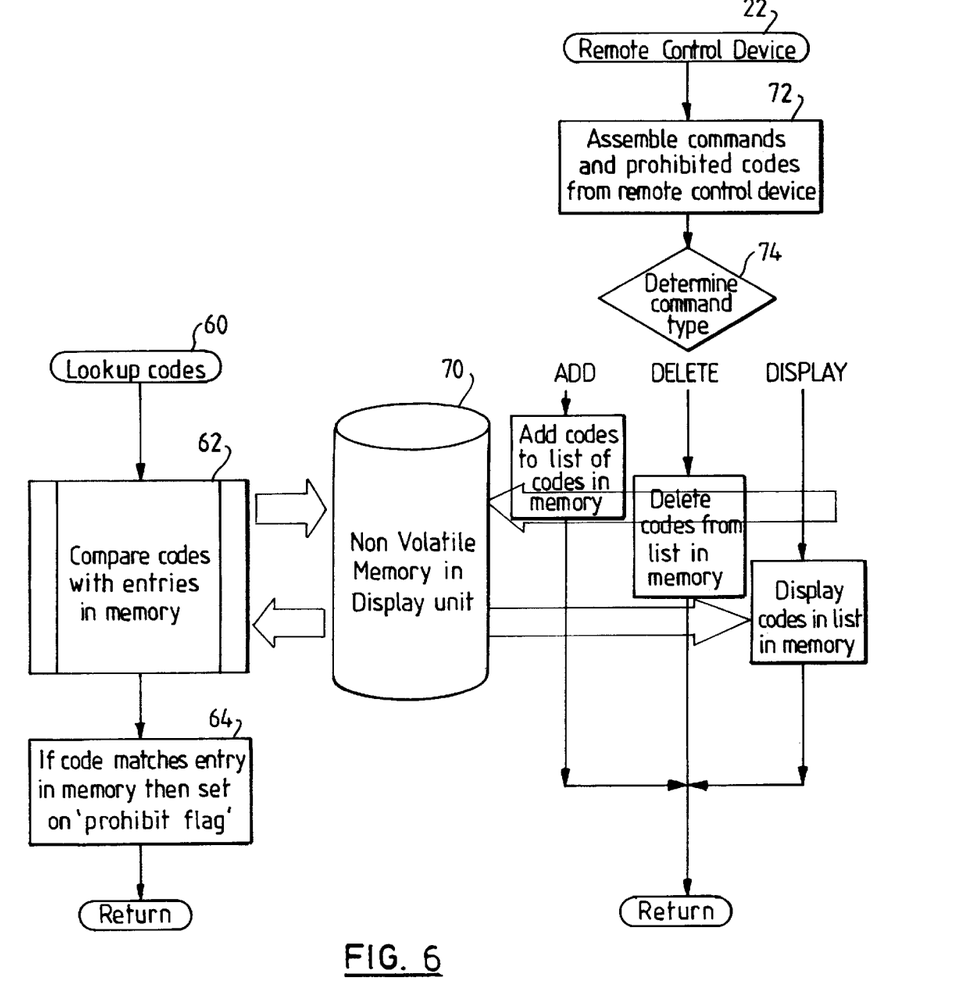
FIG. 6 is a schematic illustration of user-selection of codes when setting the classes of program to be prohibited from display.

FIG. 6 represents the operations performed by an end user to change the codes in memory in the controller and so to change the classes of video material that will be prohibited from display. The user assembles 72 commands relating to prohibited codes by key selections on the remote control device (similarly to the conventional remote entering of video recorder instructions), selecting 74 one of the commands ADD, DELETE or DISPLAY as follows:

ADD—Adds the entered code to a list of prohibited codes in the memory of the controller (by transmitting a signal which turns on a flag indicating that a particular one of a number of stored classification codes is prohibited).

DELETE—Sends a signal which deletes the prohibited code indicator flag for a particular code from the list in memory.

DISPLAY—Requests displaying of those stored codes which are flagged as prohibited. A signal is returned to the remote control device from the controller which signal includes data identifying the prohibited codes and the list of prohibited codes is displayed on a display screen of the remote control device. A facility is also preferably provided for displaying all codes (prohibited and non-prohibited) stored in controller memory.

While the preferred embodiment of the invention maintains a full list of known codes in memory and then uses a separate 'Prohibited Code' indicator, alternative embodiments may hold in memory a list of only the prohibited codes (or a list of only displayable codes).

Figure 7:
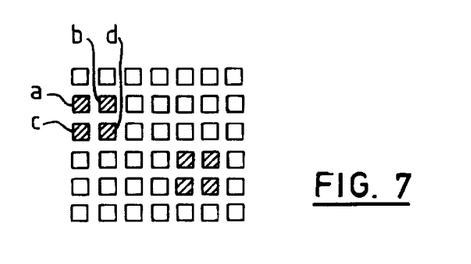
FIG. 7 shows a portion of an array of pixels.

The invisible image watermark encoding process according to the preferred embodiment described above is a spatial-domain method in which clusters or patches of pixels within the original image are randomly selected for modification by integration of watermark data. A similar encoding method suitable for use in the present invention which also uses clusters of pixels within the image will now be described. Clusters of pixels in the original image are randomly selected and the intensity value of one of the pixels within each cluster is increased by one and the intensity value of a second pixel within the cluster is decreased by one. The overall change in intensity of each cluster of pixels is unchanged, and so encoding the watermark does not result in any human perceptible change to the image. The modifications to the original image are small and randomly located. FIG. 7 is a representation of a magnified portion of an image in which two clusters (each comprising four pixels) are highlighted for reference. A first cluster comprises pixels a,b,c,d, each pixel having an intensity level between 0 and 255 (8 bits per pixel). As an example, let us say the intensity values in the original image are as follows:

I(a)=40,

I(b)=42,

I(c)=42 and

I(d)=44.

If the intensity value of pixel a is increased by one and that of pixel b is decreased by one, then the brightness of the cluster appears unchanged. The individual intensity values for this cluster within the watermarked image will now be:

I'(a)=41,

I'(b)=41,

I'(c)=42 and

I'(d)=44.

An alternative embodiment of the invention utilises perturbations in colour space within pseudo-randomly selected clusters of pixels for its watermark encoding. Prior to watermarking, the pixels a,b,c,d of the cluster of pixels highlighted in FIG. 7 may, for example, have colour intensity values a(R20,G30,B50), b(R25,G25,B50), c(R20,G30,B50) and d(R25,G25,B50). Watermarking according to this embodiment involves modifying certain colour intensities within clusters, the clusters being algorithmically selected in an apparently random distribution. The modified values for the cluster a,b,c,d may be a(R22,G30,B50), b(R23,G25,B50), c(R20,G30,B50) and d(R25,G25,B50). Note that pixels a and b have been modified inversely such that the overall colour intensities for the cluster are unchanged.

The above described preferred embodiment of the invention utilises a decoder key which is periodically updated as the encoding algorithm is periodically varied. An alternative embodiment which is within the scope of the present invention uses a pre-programmed decoder key stored within the controller and a consistently applied encoding algorithm. Each program provider may use a separate watermarking algorithm so that the most practical implementation of this embodiment of the invention would involve a plurality of decoder keys being programmed into the controller. As long as the watermarking technique is sufficiently tamper proof, such an embodiment of the invention can provide adequate safeguards and avoids the need for repeatedly communicating decoder keys. Distributors of recorded video material may similarly utilise either a common encoding process or a periodically varying encoding algorithm with, respectively, either a single common decoder key or a periodically varying decoder key which key is communicated to registered users on request.

A further alternative embodiment according to the invention dynamically generates a decoder key when the encoding process is performed, and the decoder key (representing the particular distribution of watermark information across a respective image) for use in extracting a particular watermarked code is then transmitted together with the encoded image data. The decoder key may be transmitted in an encrypted form. Transmission of decoder keys with every video broadcast entails a small communication overhead, but has the advantage of enabling the use of watermark encoding techniques which are dependent on the original image and are not a simple addition/deletion to or from the original pixel intensity values.

In a further embodiment of the present invention for use in controlling presentation via a computer screen of images and video downloaded to the local computer from a remote server computer via a communication link, the watermarked image and decoder key shown as outputs in FIG. 4 will be generated by the image or video owner substantially as described above. The watermarked image and decoder key will then be saved to an image or video store and a secure key store at the server computer rather than being transmitted straight away. When an end user downloads the watermarked image or video, together with the appropriate decoder key, a controller integrated within the local computer will identify the watermarks and prevent displaying where appropriate.

According to one embodiment of the invention described above, the controller is implemented as a feature of a computer system. However, it is also possible to implement the functions of the controller within a secure applet which is downloaded to the computer system when required. For example, video material provided by a video-on-demand server computer may be communicated to a requesting client computer together with a controller applet which performs the operations of comparing the codes integrated within the video material with the codes selected by the computer user as representing classifications of video material prohibited from display.

What is claimed is:

1. A controller for controlling displaying on a display means of received video or image data which has been encoded with invisible digital watermarks integrated within the received video or image data and representing a content classification for the video or image data, the controller having connections for connecting to a display means and for connecting to a data receiver or data reading apparatus, the controller comprising:

means for detecting digital watermarks integrated within the received video or image data, said received video or image data representing content for display;

means for decoding the digital watermarks to obtain content classification information; and means for controlling the displaying of said video or image data in response to the content classification information obtained from the watermarks.

2. A controller according to claim 1, wherein said means for controlling the displaying of said video or image data includes means for comparing the decoded content classification information with codes stored at the controller representing classes of video or image data which are not to be displayed, and means for automatically preventing display of said video or image data in a viewable form in response to identifying a match between the decoded content classification information and one of said stored codes.

3. A controller according to claim 2, including means for end user selection of the codes which the controller is responsive to for preventing display of video or image data.

4. A controller according to claim 2, wherein said means for preventing display includes an overlay buffer connectable to a display buffer of the display means in response to identifying said data as being of a class prohibited from display, and means for setting said overlay buffer with data for producing a blank image on the display means.

5. A controller according to claim 1, which is adapted for connection as an integral component of a television set and/or a personal computer.

6. A method of controlling displaying on a display means of video or image data received by a controller connected to the display means and connected for receiving data from a data receiver apparatus, the method comprising the steps of:

in response to video or image data being transmitted to the data receiver apparatus from a data transmission apparatus, said video or image data representing content for display, said video or image data having been encoded with an invisible digital watermark integrated within the video or image data, the digital watermark representing a content classification for said video or image data, providing said video or image data as an input to the controller;

decoding the digital watermark and comparing content classification information obtained thereby with stored classification information identifying classes of video or image data which are not to be displayed; and controlling displaying on a display means of the video or image data in dependence on the content classification information obtained from the digital watermark.

7. A method according to claim 6, wherein said controlling of displaying comprises automatically preventing displaying when said content classification data identifies the data as being of a class which is not to be displayed.

8. A method according to claim 6, wherein said encoding includes the step of generating a decoder key for use in said decoding, the decoder key being transmitted to the data receiver apparatus in association with said video or image data.

9. A method of encoding video or image material with content classification information, comprising:

analyzing the video or image material to determine a content classification;

encoding an invisible digital watermark within a displayable data portion of the video or image material, the invisible digital watermark integrated within the video or image data and representative of said content classification, for use by a video or image display controller having means for detecting said watermarks integrated within said displayable data portion of the video or image material, means for decoding said digital watermarks to obtain content classification information, and means for controlling displaying of said video or image material in response to the obtained content classification information.

10. A video and/or image data display system for controlled display of video or image data which has been encoded with invisible digital watermarks integrated within the video or image data and representing a content classification for the video or image data, comprising:

a receiver for receiving transmitted video or image data;

a display means for displaying the video or image data; and a controller connected between said receiver and said display means, including means for detecting digital watermarks integrated within displayable content of received video or image data, means for decoding the watermarks to obtain content classification information, and means for controlling displaying of the video or image data in response to the content classification information obtained from the watermarks.

11. A computer system having integrated therein a controller for controlling displaying on a display means connected to the computer of received video or image data which has been encoded with invisible digital watermarks integrated within the received video or image data and representing a content classification for the video or image data, the controller comprising:

means for detecting said digital watermarks integrated within displayable content of the received video or image data;

means for decoding said watermarks to obtain content classification information; and means for controlling the displaying of said video or image data on said display means in response to the content classification information obtained from said watermarks.

* * * * *

Adverse Decision in Interference

Patent No. 6,216,228, Sydney George Chapman, Julian Hamilton Jones, CONTROLLING VIDEO OR IMAGE PRESENTATING ACCORDING TO ENCODED CONTENT CLASSIFICATION INFORMATION WITHIN THE VIDEO OR IMAGE DATA, Interference No. 105,209, final judgment adverse to the patentees rendered, April 27, 2005, as to claims 1-11.

*(Official Gazette April 25, 2006)*